United States Patent
Hande et al.

(10) Patent No.: US 8,285,283 B2
(45) Date of Patent: Oct. 9, 2012

(54) METHODS AND APPARATUS FOR MAKING A HANDOFF DETERMINATION AS A FUNCTION OF SERVICE LEVEL INDICATING METRICS

(75) Inventors: Prashanth Hande, Somerset, NJ (US); Pablo Alejandro Anigstein, Gillette, NJ (US); Shailesh Patil, Bridgewater, NJ (US); Yunus Hussain, Bridgewater, NJ (US); Hyung G. Myung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1205 days.

(21) Appl. No.: 12/049,150

(22) Filed: Mar. 14, 2008

(65) Prior Publication Data
US 2009/0156211 A1  Jun. 18, 2009

Related U.S. Application Data

(60) Provisional application No. 61/026,980, filed on Feb. 7, 2008, provisional application No. 61/013,621, filed on Dec. 13, 2007, provisional application No. 61/013,624, filed on Dec. 13, 2007.

(51) Int. Cl.
*H04W 36/00* (2009.01)
*H04W 40/00* (2009.01)
(52) U.S. Cl. ........................ 455/436; 455/448
(58) Field of Classification Search .......... 455/453, 455/436–444, 448; 370/331, 338, 329, 328
See application file for complete search history.

(56) References Cited

U.S. PATENT DOCUMENTS

| 7,400,901 | B2 * | 7/2008 | Kostic et al. | 455/525 |
| 2003/0139197 | A1 * | 7/2003 | Kostic et al. | 455/525 |
| 2004/0203827 | A1 * | 10/2004 | Heiner et al. | 455/452.1 |
| 2007/0008902 | A1 | 1/2007 | Yaramada et al. | |
| 2007/0010251 | A1 | 1/2007 | Cho et al. | |
| 2009/0154425 | A1 | 6/2009 | Patil et al. | |

FOREIGN PATENT DOCUMENTS

EP    1 156 623    * 11/2001

(Continued)

OTHER PUBLICATIONS

International Search Report and the Written Opinion—PCT/US2009/032806, International Search Authority—European Patent Office—May 18, 2009.

(Continued)

*Primary Examiner* — Michael Faragalla
(74) *Attorney, Agent, or Firm* — Donald C. Kordich

(57) ABSTRACT

Method and apparatus for an access terminal which makes handoff decisions between a number of potential alternative attachment points based on service level indicating metrics are described. The access terminal computes a service level indicating metric differently for a current connection than for a potential alternative connection. A service level indicating metric is a function of loading information and received signal strength. A selection may be made by selecting between attachment points by selecting the attachment point having the highest service level indicating metric from among a plurality of attachment points, one per possible carrier where the attachment point which is considered for a given carrier is the one having the best connection for the given carrier. The access terminal handoff decision approach provides handoff decisions which are nearly as optimal as those which can be achieved using a centralized control node but without the requirement for centralized handoff decisions.

32 Claims, 9 Drawing Sheets

FOREIGN PATENT DOCUMENTS

| | | |
|---|---|---|
| EP | 1156623 A1 | 11/2001 |
| EP | 1227692 A1 | 7/2002 |
| EP | 1679921 A1 | 7/2006 |
| EP | 1841262 A1 | 10/2007 |
| FR | 2900787 | 11/2007 |
| JP | 2002359864 A | 12/2002 |
| JP | 2005027313 A | 1/2005 |
| JP | 2005033285 A | 2/2005 |
| JP | 2005229417 A | 8/2005 |
| JP | 2006135881 A | 5/2006 |
| JP | 2007180729 A | 7/2007 |
| KR | 20070006383 A | 1/2007 |
| RU | 2180159 | 2/2002 |
| WO | WO9814026 | 4/1998 |
| WO | WO2007047669 | 4/2007 |

OTHER PUBLICATIONS

International Search Report and the Written Opinion—PCT/US2008/086640, International Search Authority—European Patent Office—Apr. 27, 2009.

\* cited by examiner

METHODS AND APPARATUS FOR MAKING A HANDOFF DETERMINATION AS A FUNCTION OF SERVICE LEVEL INDICATING METRICS

RELATED APPLICATIONS

The present application claims the benefit of U.S. Provisional Application Ser. No. 61/013,621 filed Dec. 13, 2007 and identified on the application U.S. Provisional Application Ser. No. 61/013,624 filed on Dec. 13, 2007 and identified on the application and U.S. Provisional Application Ser. No. 61/026,980 filed Feb. 7, 2008. Each of the above identified patent applications is hereby expressly incorporated by reference in its entirety.

FIELD

Various embodiments relate to wireless communications, and more particularly, to methods and apparatus for making a handoff decision as a function of service level indicating metrics.

BACKGROUND

In a multi-carrier deployment wireless communications systems a number of different base station attachment points may be available to an access terminal at the same time. Some of the different available base station attachment points may correspond to different carriers. Communications capabilities between the access terminal and the different available attachment points can be expected to be different for different attachment points at different times, e.g., as a function of access terminal location, transmission signal strength, channel gain, interference, noise, etc. In addition attachment point loading conditions can be expected to vary throughout the system.

It is desirable to be able to efficiently utilize the available air link resources in a system including multiple carriers and multiple alternative attachment points to maximize throughput and enhance user experience. Load balancing in such a system is an important consideration. There is a need for a handoff mechanism that facilitates load balancing in a multi-carrier system. A centralized system control node approach to load balancing may not be practical or efficient to implement, e.g., due to system architecture, control signaling overhead and/or control signaling delays.

A mobile access terminal may be in the best situation to evaluate its current channel conditions with respect to potential alternative attachment points. Based on the above discussion, there is a need for novel access terminal based handoff decision methods and apparatus which facilitate load balancing in a multi-carrier wireless communications system. In addition, to load balancing maintaining stability is another important consideration in a communications system. It would be beneficial if any new access terminal based handoff methods and apparatus also employed techniques which contributed to system stability.

SUMMARY

Various embodiments are directed to methods and apparatus for an access terminal which makes handoff decisions between a number of potential alternative attachment points based on service level indicating metrics (SLIMs) which are computed differently for a current connection than for potential alternative connections. The service level indicating metric is, in some embodiments, a function of loading information and received signal strength. The determination as to whether or not to handoff and/or the selection of the attachment point to use following handoff is performed as a function of calculated SLIMs.

In one embodiment, the selection of an attachment point to use is part of a multi-step selection process. First for each of a plurality of carriers, a best connection is identified, e.g., the connection corresponding to the attachment point corresponding to the received power reference signal with the maximum determined SINR for the carrier. Then, a SLIM is calculated for each of the identified best connections, one SLIM per carrier. Next the attachment point corresponding to the highest SLIM is selected for use.

This SLIM based access terminal handoff decision approach provides handoff decisions which are nearly as optimal as those which can be achieved using a centralized control node but without the required overhead, signaling delays and/or infrastructure associated with centralized handoff decisions.

An exemplary method of making handoff determinations in an access terminal, in accordance with some embodiments comprises: calculating a first service level indicating metric corresponding to a current connection corresponding to a first attachment point using a first function; calculating a second service level indicating metric corresponding to an alternative connection corresponding to a second attachment point using a second function which is different from said first function; and making a handoff decision based on said first and second service level indicating metrics.

An exemplary access terminal, in accordance with some embodiments, comprises: a first service level indicating metric calculation module for calculating a first service level indicating metric corresponding to a current connection corresponding to a first attachment point using a first function; a second service level indicating metric calculation module for calculating a second service level indicating metric corresponding to an alternative connection corresponding to a second attachment point using a second function which is different from said first function; and a handoff decision module for making a handoff decision based on said first and second service level indicating metrics.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
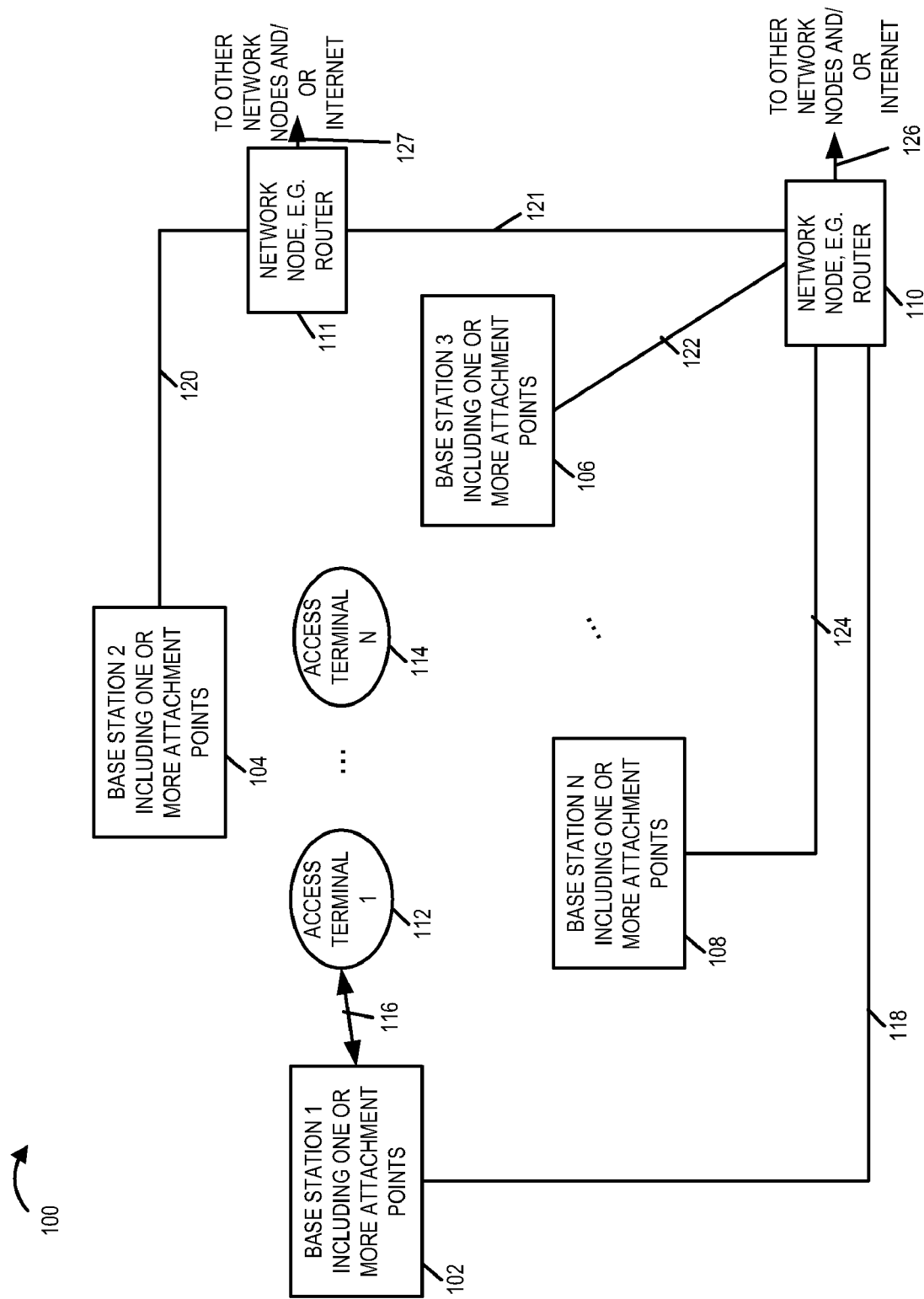
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 includes a plurality of base stations (base station 1 102, base station 2 104, base station 3 106, . . . , base station N 108) and a plurality of other network nodes, e.g., routers, (110, 111). Base stations (102, 106, 108) are coupled to network node 110 via network links (118, 122, 124), respectively. Base station 104 is coupled to network node 111 via network link 120. Network nodes (110, 111) are coupled to each other via network link 121 and are coupled to other network nodes, e.g., other base stations, routers, AAA nodes, home agent nodes, etc. and/or the Internet via network links (126, 127), respectively. The network links (118, 120, 121, 122, 124, 126, 127), are, e.g., fiber optic links. Other network topologies are possible and are used in the backhaul network in other embodiments.

The wireless communications system 100 also includes a plurality of access terminal (access terminal 1 112, . . . , access terminal N 114). An access terminal is, e.g., a wireless terminal such as a wireless mobile node which may move throughout the system and establish and maintain a wireless communications connection with an attachment point of a base station. Access terminal 1 112 currently has a wireless connection with an attachment point of base station 1 102; access terminal 1 112 makes handoff decisions based on calculated service level indicating metrics corresponding to its current attachment point and corresponding to one or more alternative attachment points. The function used to calculate the service level indicating metric for a current attachment point is different from the function used to calculate the service level indicating metric for an alternative attachment point.

Each base station includes one or more attachment points. An attachment point corresponds to a base station, base station sector and carrier combination. Various types of base stations are possible including single sector single carrier base stations, single sector multiple carrier base stations, multi-sector single carrier base station, multi-sector multi-carrier base stations using a single carrier per sector, multi-sector multi-carrier base stations using one or more carriers per sector, and multi-sector multi-carrier base stations using multiple carriers per sector.

Figure 2:
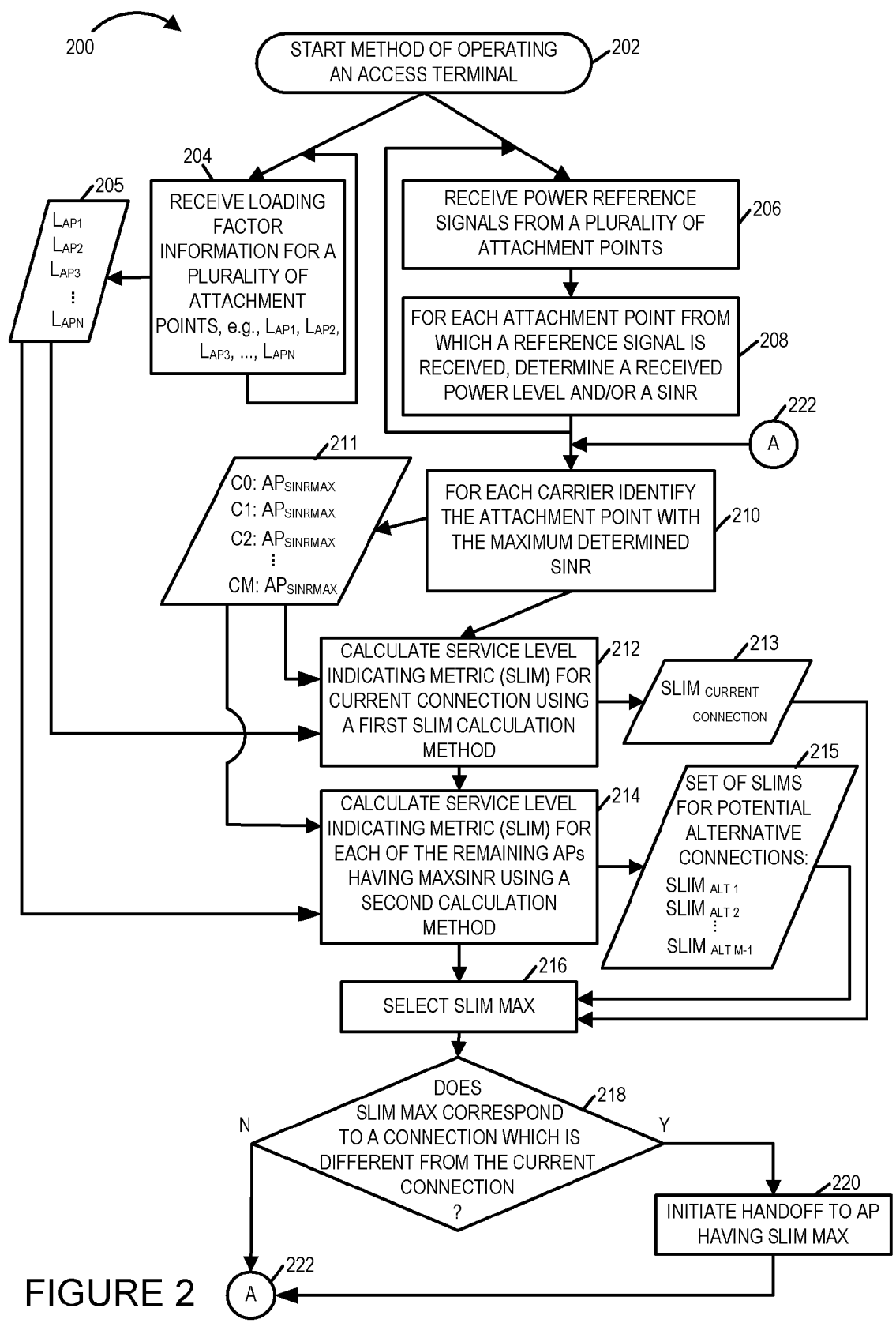
FIG. 2 is a flowchart of an exemplary method of operating an access terminal, e.g., a wireless terminal such as a mobile node, in accordance with an exemplary embodiment.

FIG. 2 is a flowchart 200 of an exemplary method of operating an access terminal, e.g., a wireless terminal such as a mobile node, in accordance with an exemplary embodiment. The exemplary method of flowchart 200 includes making handoff determination in an access terminal. Operation starts in step 202 where the access terminal is powered on and initialized and proceeds to steps 204 and 206. In step 204, which is performed on an ongoing basis, the access terminal receives loading factor information for a plurality of attachments points. Exemplary received loading factor information 205 (loading factor information for attachment point 1 ($L_{AP1}$), loading factor information for attachment point 2 ($L_{AP2}$), . . . , loading factor information for attachment point N ($L_{APN}$)) represent an output of step 204 which is used subsequently as an input to steps 212 and 214. An attachment point corresponds, e.g., to a combination of a base station, a sector of the base station, and a carrier frequency associated with the sector of the base station. In some embodiments, the loading factor information, for an attachment point, indicates a number of users using an attachment point. In some embodiments, the loading factor information, for an attachment point, includes a total link sharing weight of the attachment point.

Returning to step 206, in step 206, which is performed on an ongoing basis, the access terminal receives power reference signals from a plurality of attachment points. Then, in step 208, for each attachment point from which a reference signal is received, the access terminal determines a received power level and/or a Signal to Interference plus Noise Ratio (SINR). Operation proceeds from step 208 to step 210. In step 210 the access terminal identifies, for each carrier, the attachment point with the maximum determined SINR. Information 211, which is an exemplary list of identified attachment points with maximum determined SINR corresponding to M carriers (Carrier 0: $AP_{SINRMAX}$, Carrier 1: $AP_{SINRMAX}$, . . . , Carrier M: $AP_{SINRMAX}$) is an output of step 210 and an input to steps 212 and 214.

Thus in step 210 the access terminal identifies, on a per carrier basis, the attachments point with which the best connection can be established for each of a plurality of alternative carriers. In some embodiments, the received power reference signals corresponding to a carrier were transmitted at the same power level and identifying the attachment point with which the best connection can be established for the carrier includes selecting the attachment point from which the strongest power reference level signal corresponding to the carrier was received. In some other embodiments, the received power reference signals corresponding to a carrier may be, and sometimes are, transmitted at different known power levels and identifying the attachment point with which the best connection can be established includes selecting the attachment point as a function of the difference between known transmission power levels corresponding to different attachment points and the strength of the power reference level signals received from APs.

Operation proceeds from step 210 to step 212. In step 212, the access terminal calculates a service level indicating metric (SLIM) for its current connection using a first SLIM calculation method. $SLIM_{CURRENT\_CONNECTION}$ 213 is an output of step 212 and an input to step 216. Operation proceeds from step 212 to step 214. In step 214, the access terminal calculates a SLIM for each of the remaining attachment points having a maximum SINR using a second calculation method. Information 215, which is a set of SLIMS for potential alternative connections ($SLIM_{ALT1}$, $SLIM_{ALT2}$, $SLIM_{ALTM-1}$) are outputs of step 214 and are inputs to step 216. Note that if another connection using the same carrier as the carrier of the current connection was identified as a maximum SINR attachment point, then information 215 might include M SLIMs. The first slim calculation method used in step 212 uses a first function, and the second SLIM calculation method of step 214 uses a second function which is different from the first function.

In some embodiments, calculating the SLIM in step 212 is performed as a function of loading factor information corresponding to the current attachment point being used by the access terminal. In some embodiments, calculating a SLIM in step 214 is performed as a function of loading factor information corresponding to the attachment point of interest and a factor corresponding to an additional load which will be placed on the attachment point of interest if a handoff of the access terminal from its current attachment point to the attachment point of interest occurs. In some embodiments, the first function used in step 212 and the second function, used in step 214, use as an input a link sharing weight corresponding to the device for which a handoff determination is being made. In some embodiments, steps 212 and 214 are performed in parallel.

Operation proceeds from step 214 to step 216. In step 216 the access terminal selects the maximum SLIM from among the SLIM for the current connection and the SLIMs corresponding to potential alternative connections. Operation proceeds from step 216 to step 218. In step 218, the access terminal considers whether the selected maximum SLIM from step 216 corresponds to a connection which is different from the current connection. If the selected SLIM max corresponds to a connection other than the current connection, then operation proceeds from step 218 to step 220; otherwise operation proceeds from step 218 to connecting node A 222.

Returning to step 220, in step 220, the access terminal initiates handoff to the attachment point corresponding the selected SLIM MAX of step 216. Operation proceeds from step 220 to connection node A 222. Operation proceeds from connecting node A 222 to step 210, for another iteration of processing.

Figure 3:
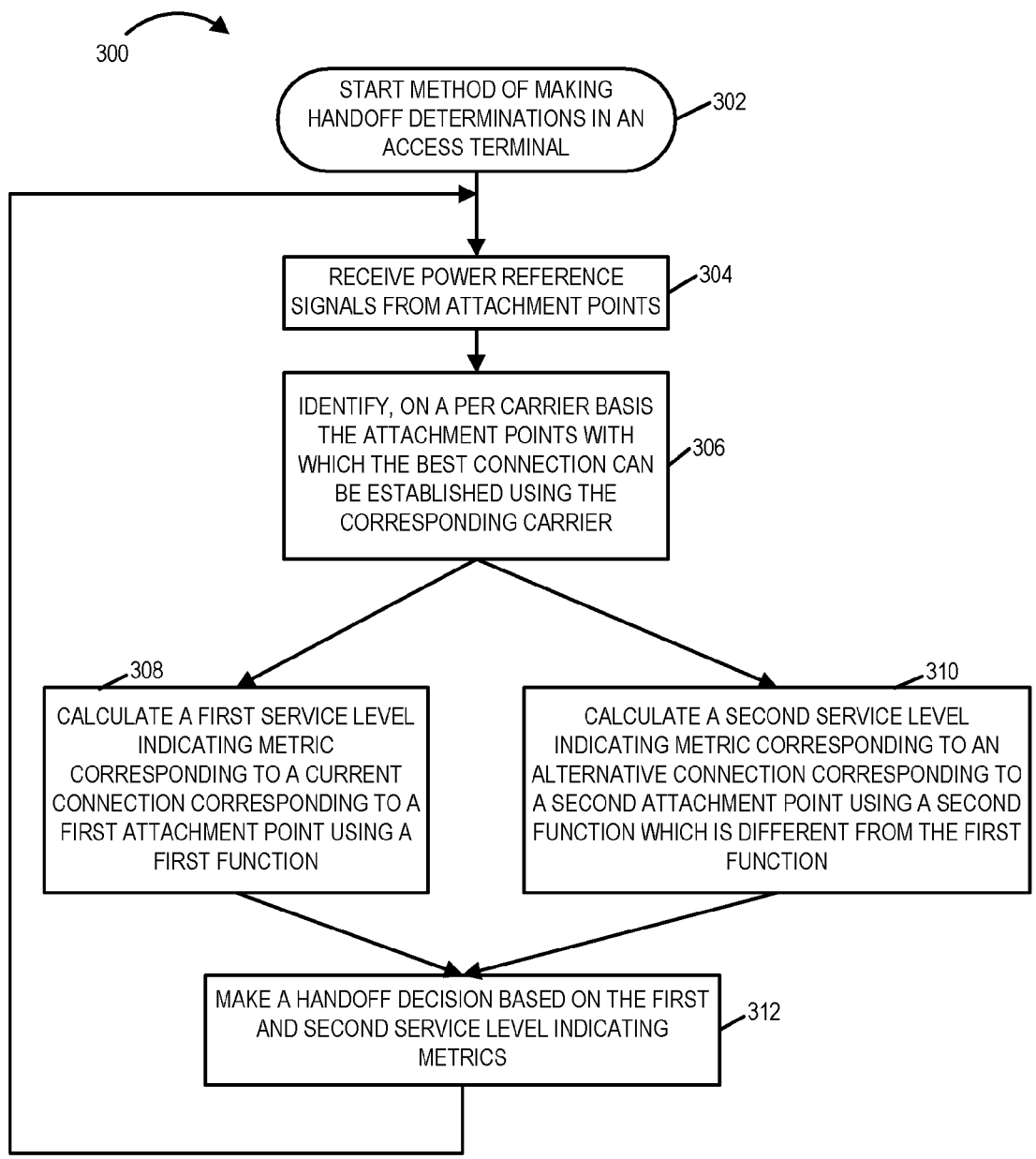
FIG. 3 is a flowchart of an exemplary method of making handoff decisions in an access terminal, e.g., a wireless terminal such as a mobile node, in accordance with an exemplary embodiment.

FIG. 3 is a flowchart 300 of an exemplary method of making handoff decisions in an access terminal, e.g., a wireless terminal such as a mobile node, in accordance with an exemplary embodiment. Operation starts in step 302, where the access terminal is powered on and initialized and proceeds to step 304. In step 304, the access terminal receives power reference signals from attachment points. In some embodiments, the received power reference signals are beacon signals, e.g., OFDM beacon signals. In some other embodiments, the received power reference signals are pilot signals, e.g., CDMA pilot signals. Operation proceeds from step 304 to step 306. In step 306, the access terminal identifies, on a per carrier basis the attachment points with which the best connection can be established using the corresponding carrier. An attachment point is, e.g., a base station point of attachment corresponding to a combination of cell, sector and carrier.

In some embodiments, the power reference signals corresponding to a carrier were transmitted at the same power level, and identifying the attachment point with which the best connection can be established includes selecting the attachment point from which the strongest power reference level signal corresponding to the carrier was received. In some other embodiments, the power reference signals corresponding to a carrier are transmitted at different known power levels, and identifying the attachment point with which the best connection can be established includes selecting the attachment point as a function of the difference between know transmission power levels corresponding to different attachment points and the strength of the power reference signals received from the attachment points.

Operation proceeds from step 306 to steps 308 and 310, which can be performed in parallel or serially. In step 308, the access terminal calculates a first service level indicating metric (SLIM) corresponding to a current connection corresponding to a first attachment point using a first function. In step 310, the access terminal calculates a second service level indicating metric corresponding to a second attachment point using a second function which is different from the first function. In some embodiments, calculating the first and second SLIMs is performed as a function of loading factor information corresponding to the first and second attachment points, respectively. In some embodiments, loading factor information indicates a number of users using the corresponding connection. In some embodiments, loading factor information corresponding to an attachment point includes a total link sharing weight of the attachment point. In various embodiments, the second function used to calculate the second SLIM includes a factor corresponding to an additional load which will be placed on the second attachment point if a handoff to the second attachment point occurs. It should be appreciated that in some embodiments where there are multiple alternative attachment points, a SLIM can, and in some embodiments is, generated for each or several of the alternative attachment points using the second SLIM function such as the one used in step 310. In some embodiments, one SLIM is generated for each alternative carrier.

In some embodiments, for each carrier on which a power reference level signal was received, a SLIM is calculated for the corresponding attachment point identified as having the best connection. Thus step 310 may be, and sometimes is, performed, for each of a plurality of different carriers. For example, consider that the access terminal has a current connection corresponding to a first attachment point, and that the current connection uses carrier f1. Further consider that the carriers f2 and f3 are available in the system. The access terminal calculates a first SLIM corresponding to the current connection, calculates a second SLIM corresponding to carrier f2 and a third SLIM corresponding to carrier f3. In some embodiments, SLIMs are not calculated for APs which are not identified as having the best connection. For example, continuing with the above example, consider that received power reference signals, e.g., beacons, from three attachment points corresponding to alternative carrier f2 are received. Further consider that the access terminal identifies a best connection corresponding to the three received power reference signals corresponding to carrier f2, e.g., as a function of determined SINR. For the determined best connection for carrier f2, the access terminal determines a SLIM; however, for the other two connections, the access terminal does not determine a SLIM.

In some embodiments, the first and second functions of steps 308 and 310 are a function of a link sharing weight corresponding to the device for which a handoff determination is being made, e.g., the access terminal.

Operation proceeds from steps 308 and step 310 to step 312. In step 312, the access terminal makes a handoff decision based on the first and second service level indicating metrics. In some embodiments, the handoff decision of step 312 is based on additional service level indicating metrics. For example, in a three carrier deployment system, the handoff decision of step 312 may be based on a SLIM corresponding to the current carrier, a SLIM corresponding to a first alternative carrier and a SLIM corresponding to a second alternative carrier. Operation proceeds from step 312 to step 304, where additional power reference signals are received.

Figure 4:
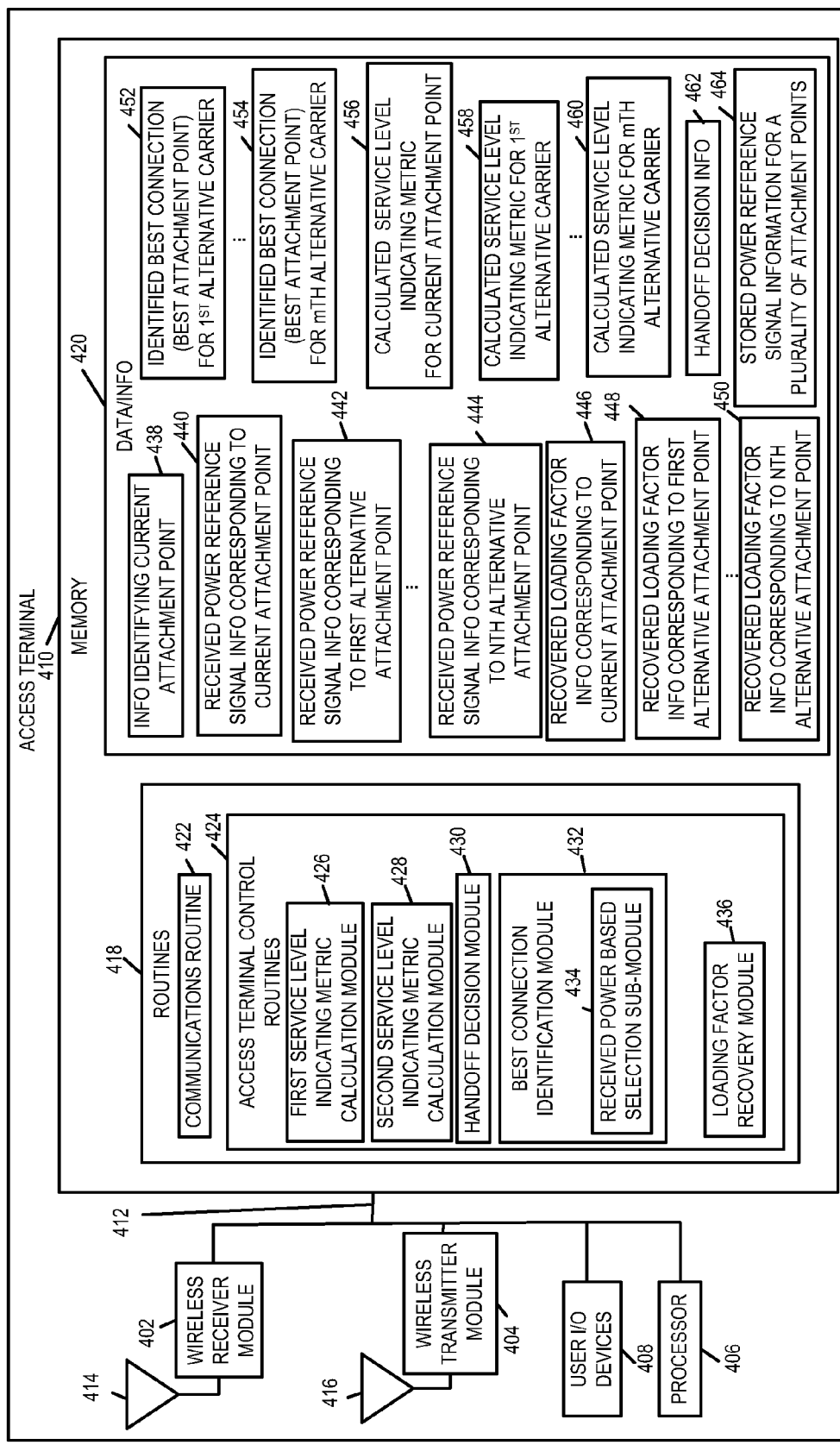
FIG. 4 is a drawing of an exemplary access terminal, e.g., a wireless mobile node, in accordance with an exemplary embodiment.

FIG. 4 is a drawing of an exemplary access terminal 400, e.g., a wireless mobile node, in accordance with an exemplary embodiment. Exemplary access terminal 400 includes a wireless receiver module 402, a wireless transmitter module 404, a processor 406, user I/O devices 408 and a memory 410 coupled together via a bus 412 over which the various elements may interchange data and information.

Memory 410 includes routines 418 and data/information 420. The processor 406, e.g., a CPU, executes the routines 418 and uses the data/information 420 in memory 410 to control the operation of the access terminal 400 and implement methods, e.g., the method of flowchart 200 of FIG. 2 or flowchart 300 of FIG. 3.

User I/O devices 408 include, e.g., a microphone, a keypad, a keyboard, switches, a camera, a speaker, a display, etc. User I/O devices 408 allow a user of access terminal 400 to input data/information, access output data/information, and control at least some function of the access terminal 400.

Wireless receiver module 402, e.g., an OFDM receiver, is coupled to receive antenna 414 via which the access terminal 400 receives signals, e.g., downlink signals from attachment points. Received signals include, e.g., power reference signals, e.g., beacons and/or pilot signals, broadcast signals communicating load factor information, handoff signals, and traffic channel signals. Information is obtained from received power reference signals received by wireless receiver module 402. Corresponding to a received power reference signal from the current attachment point, information 440 is obtained, e.g., a power measurement and/or a SINR value. Corresponding to a received power reference signal from the a first alternative attachment point, information 442 is obtained, e.g., a power measurement and/or a SINR value. Corresponding to a received power reference signal from an Nth alternative attachment point, information 446 is obtained, e.g., a power measurement and/or a SINR value.

Wireless transmitter module 404, e.g., an OFDM transmitter, is coupled to transmit antenna 416 via which the access terminal 400 transmits signals, e.g., uplink signals to attachment points of base stations. Uplink signals include, e.g., handoff signals and uplink traffic channel signals.

Routines 418 include a communications routine 422 and access terminal control routines 424. The communications routine 422 implements the various communications protocols used by the access terminal 400. Access terminal control routines 424 include a first service level indicating metric calculation module 426, a second service level indicating metric calculation module 428, a handoff decision module 430, a best connection identification module 432 and a loading factor recovery module 436.

Data/information 420 includes information identifying the current attachment point 438, received power reference signal information corresponding to the current attachment point 440, received power reference signal information corresponding to a plurality of potential alternative attachment points (received power reference signal information corresponding to a first alternative attachment point 442, ..., received power reference signal information corresponding to an Nth alternative attachment point 444), recovered loading factor information corresponding to the current attachment point 446, recovered loading factor information corresponding to a plurality of potential alternative attachment points (recovered loading factor information corresponding to a first alternative attachment point 448, ..., recovered loading factor information corresponding to an Nth alternative attachment point 450), identified best connections corresponding to each of a plurality of alternative carriers (identified best connection (best attachment point) for a $1^{st}$ alternative carrier 452, ..., identified best connection (best attachment point) for an Mth alternative carrier 454), a calculated service level indicating metric for the current attachment point 456, calculated service level indicating metrics for alternative carriers (calculated service level indicating metric for a $1^{st}$ alternative carrier 458, ..., calculated service level indicating metric for an Mth alternative carrier 460), handoff decision information 462 and stored power reference signal information for a plurality of attachment points 464.

First service level indicating metric calculation module 426 calculates a first service level indicating metric corresponding to a current connection corresponding to a first attachment point using a first function. Information 456 is an output of module 426 and corresponds to the attachment point identified by information 438.

Second service level indicating metric calculation module 428 calculates a second service level information metric corresponding to an alternative connection corresponding to a second attachment point using a second function which is different from the first function. With regard to a first alternative carrier, information 458 is an output of module 428 corresponding to information 452. With regard to another alternative carrier, information 460 is an output of module 428 corresponding to information 454.

The first service level indicating metric calculation module 426 calculates the first service level indicating metric as a function of loading factor information corresponding to the current attachment point. The second service level indicating metric calculation module 428 calculates a second service level indicating metric as a function of loading factor information corresponding to an attachment point which is not the current attachment point of the access terminal. At times, the second service level indicating metric calculates a service level indicating metric for each of a plurality of different attachment points corresponding to different alternative potential carriers. In some embodiments, the function used by the second service level indicating metric calculation module 428 includes a factor corresponding to an additional load which will be placed on the attachment point for which the service level indicating metric is being calculated if a handoff of the access terminal 400 occurs from the attachment point of the current connection to the attachment point of the potential connection for which the service level indicating metric is being calculated.

In some embodiments, for each carrier on which a power reference level signal was received, at least one of the first service level indicating metric calculation module 426 and the second service level indicating metric calculation module 428 calculates a service level indicating metric for the corresponding attachment point identified as having the best connection. In some embodiments, the second service level indicating metric calculation module 428 does not compute a service level indicating metric for attachment points which are not identified as having the best connection. Thus the best connection identification module 432 effectively screens multiple potential attachment points for a carrier, and allows the second service level indicating metric calculation module 428 to, in some embodiments, calculate just one service level indicating metric per carrier, thus reducing the amount of processing than would otherwise be required if multiple service level indicating metrics were calculated per carrier.

In some embodiments the first and second function used by the first and second service level indicating metric calculations modules (426, 428), respectively, are a function of a link sharing weight corresponding to the access terminal.

Handoff decision module 430 makes a handoff decision based on service level indicating metrics calculated by the first service level indicating metric calculation module 426 and the second service level indicating metric calculation module 428. For example, handoff decision module 430 uses the calculated service level indicating metric for the current attachment point 456 and at least one of the service level indicating metrics corresponding to alternative carriers (calculated service level indicating metric for $1^{st}$ alternative carrier 458, ..., calculated service level indicating metric for mth alternative carrier 460) to make a handoff decision. In some embodiments, the handoff decision module 430 uses each of the calculated service level indicating metrics (456, 458, ..., 460) in making a handoff decision. Handoff decision information 462 is an output of handoff decision module 430.

Loading factor recovery module 436 recovers loading factor information communicated from attachment points. In some embodiments, the loading factor information corresponding to a base station attachment point is communicated via a broadcast signal or signal, e.g., via a broadcast message. Recovered loading factor information corresponding to the current attachment point 446, recovered loading factor information corresponding to a first alternative attachment point 448, ..., recovered loading factor information corresponding to an Nth alternative attachment point 450 are outputs of loading factor recovery module 436.

Best connection identification module 432 identifies, on a per carrier basis, the attachment points with which the best connection can be established. Identified best connection (best attachment point) for a $1^{st}$ alternative carrier 452 and identified best connection (best attachment point) for an Mth alternative carrier 454 are exemplary outputs of best connection identification module 432.

Best connection identification module 432 includes a received power based selection sub-module 434. In some embodiments, e.g., some embodiments in which the power reference signals from different attachment points are transmitted at the same power level, the received power based selection sub-module 434 selects that attachment point from among a plurality of attachment points corresponding to the same carrier from which the strongest reference signal corresponding to the carrier was received. In some embodiments, e.g., some embodiments, in which different attachment points transmit power reference signals at different predetermined known levels, the received power based selection sub-module 434 selects the attachment point from among a plurality of attachment points corresponding to the same carrier as a function of the difference between known transmission power levels corresponding to different attachment points and the strength of the power reference level signals received from the attachment points. Stored power reference signal information for a plurality of attachment points 464 includes information associating attachment points with predetermined transmission power levels of power reference signals and/or information associating attachment points with relative power relationships. An exemplary relative power relationship, with regard to power reference signals, is that a first attachment point transmits at a baseline power level, a second attachment point transmits at a power level 6 dBs above the first power level and a third attachment point transmits at a power level 6 dBs above the second power level.

Some examples of SLIM calculations will now be presented. In some embodiments, SLIM is a function of (i) received power information, SNR information and/or SINR information and (ii) load information, e.g., SLIM=f(SINR, load). In some such embodiments, load is represented by a number of users corresponding to an attachment point, for example, the number of users last reported to be on the attachment point for the attachment point of a current connection, or the number of users last reported to be on the attachment point+1 for an alternative attachment point. Calculating SLIM for an attachment point as a function number of users works well in embodiments where the scheduler, e.g., base station attachment point scheduler, performs resource fair scheduling.

An example of a first function for calculating a first service level indicating metric corresponding to a current connection connecting to a first connection and an example of a second function for calculating a second service level indicating metric corresponding to alternative connection corresponding to an alternative attachment point will now be given.

Own Connection:

$$SLIM=(\log(1+SINR))/N_{users}$$

Different Connection (possible handoff target):

$$SLIM=(\log(1+SINR))/(N_{users}+1)$$

where $N_{users}$, for the connection, is the numbers of users, e.g., active users, reported to the access terminal to be on the attachment point of the connection, and where SINR, for the connection, is a signal to interference plus noise ratio determined by the access terminal based on a received power reference signal from the attachment point.

In some embodiments, active users are defined are users in On or Hold state but do not include users in sleep state.

Another example of a first function for calculating a first service level indicating metric corresponding to a current connection connecting to a first connection and another example of a second function for calculating a second service level indicating metric corresponding to alternative connection corresponding to an alternative attachment point will now be given.

Own Connection:

$$SLIM=(\log(1+SINR))/N_{traffic}$$

Different Connection (possible handoff target):

$$SLIM=(\log(1+SINR))/(N_{traffic}+1)$$

where $N_{traffic}$, for the connection, is the numbers of users, e.g., active users, reported to the access terminal to be on the attachment point of the connection for which there is traffic to be communicated, and where SINR, for the connection, is a signal to interference plus noise ratio determined by the access terminal based on a received power reference signal from the attachment point.

In some embodiments, $N_{traffic}$ can be further refined to be one of $N_{trafficuplink}$ or $N_{trafficdownlink}$. For example, $N_{trafficuplink}$ for the connection, is the numbers of users, e.g., active users, reported to the access terminal to be on the attachment point of the connection who have traffic and are requesting uplink traffic segments. Alternatively, $N_{trafficdownlink}$ for the connection, is the numbers of users, e.g., active users, reported to the access terminal to be on the attachment point of the connection for which the attachment point has downlink traffic to communicate.

In some embodiments, load in the SLIM calculation is represented by link sharing weight information. This approach works well where users as associated with link sharing weights, e.g., pre-specified link sharing weights. Each user can be associated with a link sharing weight, $L_i$. For example, Total weight=$\Sigma$ link sharing weights of an attachment point or $T_{AP}=\Sigma L_i$ for i=1 to j. Different attachment point may, and sometimes do, have different total weights.

Another example of a first function for calculating a first service level indicating metric corresponding to a current connection connecting to a first connection and another example of a second function for calculating a second service level indicating metric corresponding to alternative connection corresponding to an alternative attachment point will now be given.

Own Connection:

$$SLIM=L_i(\log(1+SINR))/(T_{AP})$$

Different Connection (possible handoff target):

$$SLIM=L_i(\log(1+SINR))/(T_{AP}+L_i)$$

where $L_i$, corresponding to a connection, is the access terminal's $L_i$ for the attachment point. The $L_i$ can be fixed with the user or communicated to the user from the attachment point, e.g., upon a connection establishment with the user, where $T_{AP}$ is the total weight associated with an attachment point, where SINR, for the connection, is a signal to interference plus noise ratio determined by the access terminal based on a received power reference signal from the attachment point.

In various examples, shown above different SLIM calculations are performed depending upon whether or not the attachment point under consideration correspond to a current connection or an alternative connection. By using different SLIM calculations for current and alternative potential connections, the access terminal may be considered to be determining and considering expected or estimated loading conditions at the attachment points under consideration, at a time subsequent to the handoff decision. This use of different SLIM functions also provides stability in the system when a handoff occurs and tends to prevent an access terminal from rapidly toggling back and forth between two attachment points. Thus, this approach advantageously tends to add hysteresis to the handoff transition.

An exemplary handoff based SLIM approach will now be described. This approach may be used, e.g., in the method of flowchart 200 of FIG. 2, the method of flowchart 300 of FIG. 3 and/or the access terminal 400 of FIG. 4. The access terminal receives power reference signal from a plurality of attachment points. Then the access terminal measures the received power and/or determines at least one of a received power level, a SIR and a SINR corresponding to each received power reference signal. Next the access terminal determines, for each carrier a best attachment point, e.g. the best attachment point for a carrier corresponding to the maximum received power or the maximum SINR for the carrier. Then, the access terminal determines a SLIM value for each carrier. The SLIM calculation function is used is different depending upon whether the attachment point corresponds to the current connection or to an alternative connection. Then, the access terminal selects to use the attachment point corresponding to the maximum calculated SLIM. If the selected attachment point is different from the current connection, the access terminal initiates a handoff to the new attachment point.

An example will now be presented to illustrate an exemplary SLIM based handoff. Consider that an access terminal is currently connected to attachment point 1, which is using carrier frequency f0, and the access terminal receives a power reference signal from attachment point 1. Consider that the access terminal also receives power reference signals from 5 other attachment points in its local vicinity: attachment point 2 which uses carrier f1, attachment point 3 which uses carrier f1, attachment point 4 which uses carrier f1, attachment point 5 which uses carrier f2, and attachment point 6 which uses carrier f2. The access terminal determines SINRs for each received power reference signal ($SINR_{AP1}$, $SINR_{AP2}$, $SINR_{AP3}$, $SINR_{AP4}$, $SINR_{AP5}$, $SINR_{AP6}$). The access terminal determines that the max SINR for carrier f0 is $SINR_{AP1}$. The access terminal determines max SINR for carrier f1 to be $SINR_{AP3}$ from the set of {$SINR_{AP2}$, $SINR_{AP3}$, $SINR_{AP4}$}. The access terminal determines max SINR for carrier f2 to be $SINR_{AP6}$ from the set of {$SINR_{AP5}$, $SINR_{AP6}$}. The access terminal calculates a SLIM for attachment point 1 using a first function; the access terminal calculates an SLIM for attachment point 3 using a second function; the access terminal calculates a SLIM for attachment point 6 using the second function. The access terminal determines the maximum SLIM from {$SLIM_{AP1}$, $SLIM_{AP3}$, $SLIM_{AP6}$} to be $SLIM_{AP3}$. Therefore the access terminal initiates a handoff from attachment point 1 to attachment point 3.

This multi-step approach to handoff contributes to stability in the system. In addition, for a fair resource allocation constrained system, this SLIM based approach can achieve nearly optimal performance.

Figure 5:
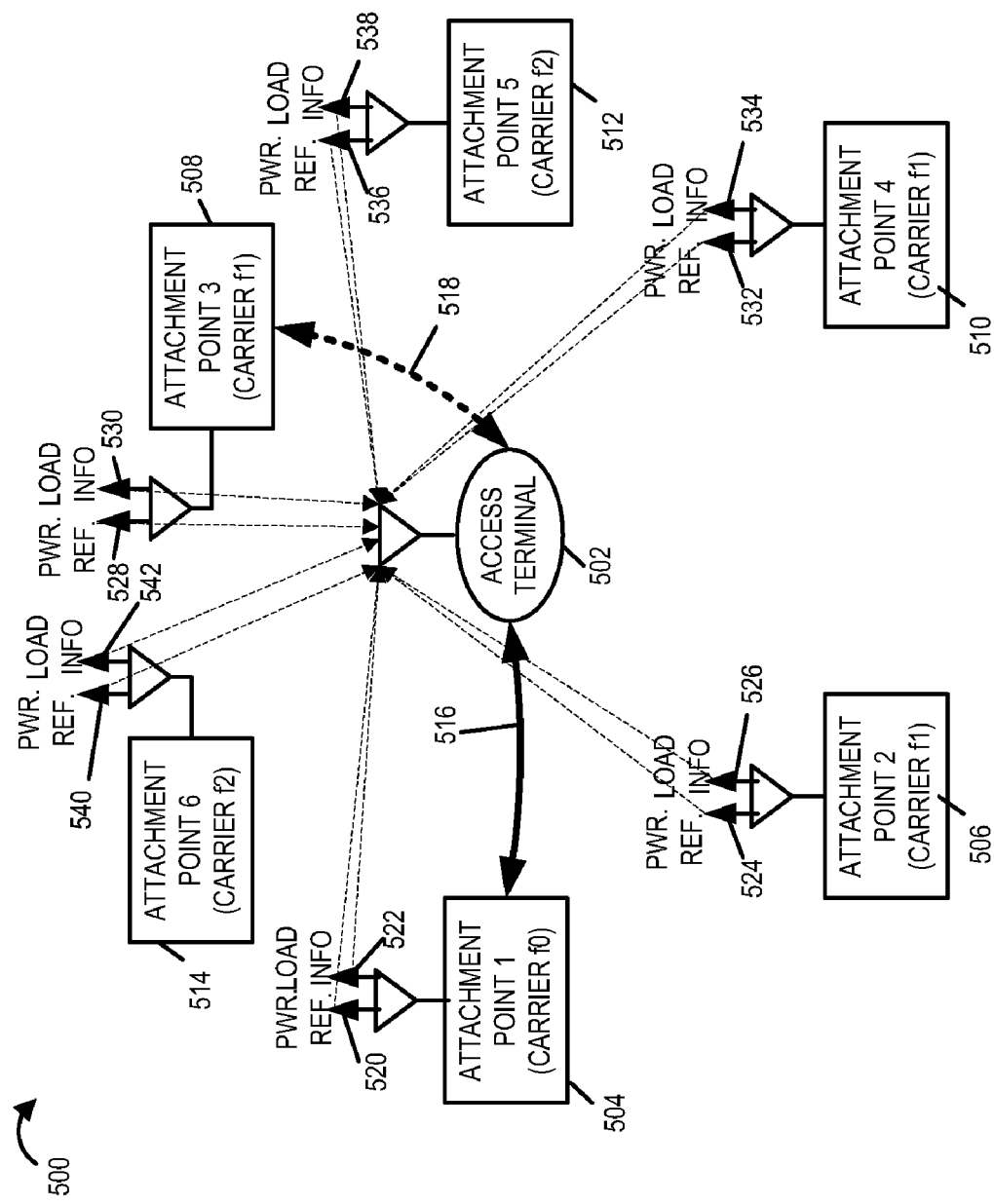
FIG. 5 and FIG. 6 are used to illustrate an example of a service level indicating metric based handoff method.
Figure 6:
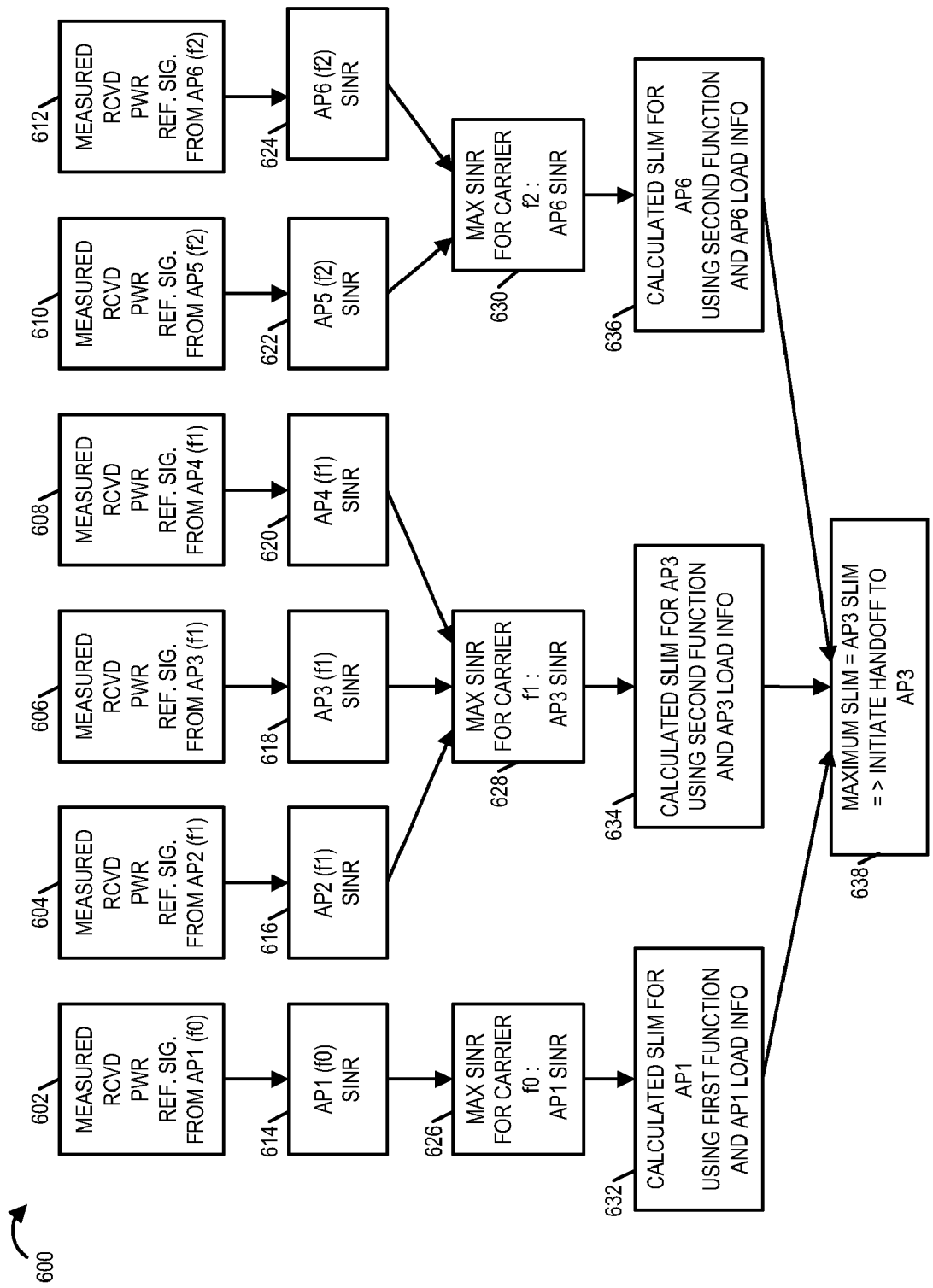

Drawing 500 of FIG. 5 and drawing 600 of FIG. 6 are used to illustrate the above-described example. Access terminal 502 is, e.g., access terminal 400 of FIG. 4 or any of the access terminals in system 100 of FIG. 1. The attachment points (504, 506, 508, 510, 512, 514) in FIG. 5 are, e.g., attachment points included in base stations such as those shown in FIG. 1. In FIG. 5 access terminal 502 is currently connected to attachment point 1 504 as illustrated by solid line arrow 516. Access terminal 502 receives power reference level signals, e.g., OFDM beacon signals, from a plurality of attachment points in the vicinity. More specifically access terminal 502 receives power reference level signals (520, 524, 528, 532, 536, 540) from attachment points (504, 506, 508, 510, 512, 514), respectively. The access terminal 502 also receives loading information signals (522, 526, 530, 534, 538, 542) from attachment points (504, 506, 508, 510, 512, 514), respectively. In some embodiments, an attachment point may, and sometimes does, transmit loading information about other attachment points in addition to its own attachment points, e.g., with the loading information having been exchanged between attachment points via a backhaul network.

Access terminal 502 processes at least some of the received signals and makes a handoff decision. In this example, access terminal 502 decides to handoff to attachment point 3 508 as indicated by dotted line arrow 518.

Drawing 600 of FIG. 6 is used to illustrate aspects of an exemplary SLIM based handoff method for the example. The received power is measured on each of the received power reference level signals resulting in (measured received power of power reference signal from attachment point 1 602, measured received power of power reference signal from attachment point 2 604, measured received power of power reference signal from attachment point 3 606, measured received power of power reference signal from attachment point 4 608, measured received power of power reference signal from attachment point 5 610, measured received power of power reference signal from attachment point 6 612). Signal to interference plus noise ratios (attachment point 1 SINR 614, attachment point 2 SINR 616, attachment point 3 SINR 618, attachment point 4 SINR 620, attachment point 5 SINR 622, attachment point 6 SINR 624) are determined corresponding to each of the measured received power reference signals obtained (602, 604, 606, 608, 610, 612), respectively.

Then, for each carrier a best attachment point is selected. Attachment point 1 uses carrier f0; attachment points 2, 3, and 4 use carrier f1; attachment points 5 and 6 use carrier f2. In this case the best attachment point is the attachment point for the carrier with the greatest SINR. In this example, corresponding to carrier f0 the maximum SINR corresponds to the attachment point 1 SINR as indicated by block 626. Corresponding to carrier f1 the maximum SINR corresponds to attachment point 3 SINR as indicated by block 628. Corresponding to carrier f2 the maximum SINR corresponds to attachment point 6 630 as indicated by block 630.

Then, the access terminal calculates a service level indicating metric corresponding to each identified maximum SINR. For carrier f0 a SLIM is calculated for attachment point 1 using a first SLIM function, since AP 1 is the access terminal's current connection, and using AP 1 loading information. For carrier f1 a SLIM is calculated for attachment point 3 using a second SLIM function which is different from the first SLIM function, since AP 3 is not the access terminal's current connection, and using AP 3 loading information. For carrier f2 a SLIM is calculated for attachment point 6 using the second SLIM function, since AP 6 is also not the access terminal's current connection, and using AP 6 loading information.

Then the access terminal determines to use the attachment point corresponding to the maximum SLIM, which in this example happens to be SLIM 3, so the access terminal initiates a handoff from attachment point 1 to attachment point 3 as indicated by block 638. In some other embodiments, other SLIM based criteria may be used for a handoff decision, e.g., a SLIM of an attachment point of a potential alternative connection has to be greater than the SLIM of the current connection by a predetermined amount for a handoff to occur.

Various aspects, features, embodiments, nodes and/or systems will now be described. One or more of aspects and/or features described below may be used in the system 100 of FIG. 1, the method of flowchart 200, the method of flowchart 300 and/or the access terminal 400 of FIG. 4. An access terminal is sometimes alternatively referred to as a wireless terminal.

Consider the case of a multi-carrier network in which a terminal supports use of a single-carrier at a time. In one such a system, the handoff methodology on the terminal has to decide on the appropriate sector and carrier to establish a connection. Various aspects are directed to a mechanism that enables a seamless handoff in such a system. The handoff is based on a metric that can be called a service level indicating metric (SLIM). A mechanism is described that enables SLIM calculation and seamless handoff. Simulations have demonstrated the optimality of the achieved terminal-sector alignment with the proposed SLIM-based handoff methodology. The implementation of this feature is described in an exemplary orthogonal frequency division multiplexing (OFDM) network.

Consider a multi-carrier network where the Base Stations (BSs) are transmitting on more than one carrier frequency. A network based on EVDO-Rev. B is one such system where multiple carriers are aggregated to enhance the sector throughput and user experience. Now consider the situation where the wireless terminals (WTs) are limited to single-carrier unlike the Rev. B case. This is the situation in one exemplary multi-carrier deployment scenario using OFDM. This implies that the terminal peak throughputs remain the same as in the single-carrier case. However, the sector throughput is still proportional to the number of carriers deployed. In addition, the capacity share of the WTs increases boosting user experience. A major advantage of limiting the WT capability to a single-carrier is that the terminal power consumption remains the same unlike a multi-carrier capable WT where the power consumption goes up roughly proportional to the number of carriers processed by the RF front end. Some existing WTs can be modified to support operation in multi-carrier systems through an upgrade that implements a new handoff methodology proposed herein. Other new wireless terminals may be originally implemented in accordance with the new handoff methodology proposed herein.

Given the advantages of a single-carrier WT in a multi-carrier network, the problem of selecting the appropriate carrier for a given WT is to be addressed for any distribution of the WTs across carriers in the network. A handoff mechanism is described in such a scenario that achieves the appropriate load-balancing to obtain a near optimal increase in sector throughput and user experience.

Exemplary system setup and the SLIM based handoff methodology are subsequently described. Simulation methods and the results are also described. An exemplary quality-of-service (QoS)-aware handoff methodology based on SLIM is also described. Implementation issues such as load information quantization and approximation of the SLIM function for reduced computational complexity are also described.

Handoff in an exemplary multi-carrier system and exemplary system set-up will now be described. Handoff in an exemplary OFDM multi-carrier system is facilitated by the broadcast of carrier related information by the base station (BS). The BS broadcasts may be not only the sector-specific carrier related information but also the carrier-related information from each of the neighboring sectors. The list of neighboring sectors itself is built up at the BS. Since there in no centralized Base-Station Controller in this exemplary-OFDM network, the neighbor list build up is useful and is exploited by to the multi-carrier handoff methodology.

The carrier related information that is broadcasted by the BS includes the carrier identity, the carrier power level, and the carrier load-factor. On exemplary OFDM embodiment supports up to 3 carriers, identified as carriers 0, 1, and 2. The WT can measure the sector strength by measuring the received power of the acquisition signal from a sector (one such OFDM acquisition signal is called a beacon, e.g., a single-tone beacon signal) and use the broadcasted carrier power level information to derive the signal-to-interference ratio (SIR) that the WT would potentially experience if it were to be connected to that sector and carrier. One may refer to a given combination of sector and carrier as a connection. Handoff to a connection can occur if the derived SIR for that connection is higher in comparison to the SIR on the current connection. However, with multiple carriers in a sector with each transmitted at the same power level, the SIR measurement on each of the carrier in a given sector will be near-identical making SIR-based handoff decision imprecise. In an embodiment, with multiple carriers at different power levels, if one hands off to the carrier of the highest power level this will resulting in a non-optimal configuration. So, in some embodiments, it is important that the handoff decision take into consideration factors beyond the potential SIR that the WT can experience.

An exemplary metric used for handoff decisions, referred to as service level indicating metric (SLIM) will now be described. The handoff in an exemplary OFDM multi-carrier system takes into account the broadcasted carrier load-factor, L, to calculate a metric that we refer to as the Service Level-Indicating Metric, or SLIM which will be indicative of the user experience of the WT on any given sector and carrier. One way to define SLIM is as follows:

$$SLIM = L \cdot \log_{10}(1 + \gamma \cdot SIR) \quad (1)$$

where SIR is the signal-to-interference ratio and L is some indication of the loading on the carrier of interest. One possibility is to define $L=1/(1+N_{users})$, where $N_{users}$ is the number of users. The users that are counted in $N_{users}$ can include each of the active users in the sector and carrier of interest.

One exemplary handoff method will now be described. The exemplary handoff method for the multi-carrier feature can be described as follows:

1. Calculate the SIR for each carrier in every sector whose acquisition signal can be detected and measured by the WT. If the SIR on a different sector on the same carrier as the current connection is stronger than the SIR of the current connection, then handoff to that sector and carrier.
2. Calculate the SLIM for the sector with the highest SIR in each of the carriers. If the SLIM on a different carrier is higher than the SLIM of the current connection, handoff to that sector and carrier.

This handoff method ensures that the WT is connected to the sector of maximum strength on a given carrier. Further, the method ensures that the WT is connected to the carrier on which it measures the highest SLIM. Connecting to the strongest sector on a given carrier irrespective of the load (and hence the SLIM) on that sector and carrier ensures that the WT transmit power for uplink connectivity is minimized and the Raise over Thermal (RoT) at the BSs is kept to the minimum, resulting in a stable system.

Various system simulations will now be described. System level simulations were performed to verify the performance of the SLIM-based handoff method in the downlink. One can compare the exemplary SLIM-based handoff method to an optimal path-loss based handoff method. The optimal path-loss based handoff method is to handoff to the sector to which the WT has the minimum path loss and then assign the WT to an optimal carrier within the sector based on an optimality criterion. Users assigned to a sector are ordered based on the path loss. The weakest users are allocated to the strongest carrier, the strongest users to the weakest carrier, and the rest are allocated to the third carrier. The optimal allocation boundaries are determined such that the sum log rate is maximized. The optimal path-loss based handoff method requires a centralized controller and hence is not practical.

In the simulations, it is assumed that there are three carriers in each sector. We consider two cases of carrier power profile. In equal powers configuration, all three carriers have the same transmit power. In the second case, for the base station sector, different carriers have different power profiles, the second strongest carrier is 6 dB weaker than that of the strongest carrier and the weakest carrier is 12 dB lower than the strongest carrier. Table 1 below show the simulation results. Table 1 illustrates a throughput comparison. The numbers in parenthesis are increase of throughput relative to the equal power scheme.

TABLE 1

|  | OFDM Multi-carrier equal power deployment scheme/ Path loss based handoff methodology or SLIM based handoff methodology | OFDM Multi-carrier-multi-power level deployment scheme/ Path loss-based handoff methodology | OFDM Multi-carrier-multi-power level deployment scheme/ SLIM-based handoff methodology |
|---|---|---|---|
| Mean sector throughput | 7549 kbps | 9053 kbps (19.9%) | 9240 kbps (22.4%) |
| Mean user throughput | 130 kbps | 150 kbps (15.4%) | 148 kbps (13.8%) |
| 90% user throughput | 250 kbps | 261 kbps (4.4%) | 261 kbps (4.4%) |
| Median user throughput | 99 kbps | 105 kbps (6.1%) | 105 kbps (6.1%) |
| 10% user throughput | 46 kbps | 61 kbps (32.6%) | 64 kbps (39.1%) |

For the case of 3 carriers of equal powers, path loss-based round robin allocation and SLIM-based allocation have virtually identical performance.

For the case of 3 carriers in the multi-carrier multi-power level configuration, optimal path loss-based handoff results in better throughput in low SIR regime but SLIM-based handoff results in better throughput in the mid-to-high SIR regime. Throughput performances are almost identical except for the low SIR regime. One may conclude that SLIM-based allocation scheme is nearly optimal in terms of throughput performance.

When comparing an equal power level multi-carrier OFDM deployment scheme with a multi-carrier multi-power level OFDM deployment scheme, the multi-carrier multi-power level OFDM deployment scheme improves SIR of cell-edge users for both path loss-based and SLIM-based schemes. One can see that there is a significant throughput performance gain for multi-carrier OFDM deployment scheme.

Quality of Service (QoS) aware handoff using SLIM will now be described. The handoff algorithm discussed above performs reasonable in the presence of just best effort traffic. In this section, an approach to extending the SLIM based handoff methodology to handle quality-of-service (QoS) traffic is described. To keep the discussion simple, consider the QoS criterion to be a fixed minimum rate. The proposed framework can be extended to other QoS parameters including packet delays. Users are grouped into QoS users (QU) with only QoS traffic and best effort users (BEU) with only best-effort traffic. The proposed framework can be extended to handle users with mixed traffic. The handoff method should try to ensure that the QoS criterion is satisfied for a QoS User.

The guiding principle behind this extension is that the scheduler will allocate resources strictly prioritizing QU over BEU. Therefore the handoff decision of a QU can be based on visibility into the fraction of time-frequency resources currently consumed for QoS support. A handoff decision of a BEU, on the other hand, can be based on visibility into the number of other BEUs with whom the resources have to be shared with.

To describe the exemplary handoff method we use the following notation. Let F denote the fraction of time-frequency resource (or OFDM tiles or OFDM tone-symbols) being used for non QoS purposes, i.e., the unused resources plus those used to serve BEUs. Let $N_{BEU}$ and $N_{QU}$ be the number of BEUs and QUs, respectively, $R_{QU}$ be the minimum rate requirement for QUs (each of the QUs have same rate requirement) and BW is the total bandwidth.

Now note that for any QU i, $$\frac{R_{QU}}{BW \cdot \log_2(1 + SIR_i)}$$

is the fraction of resources used by the user on the current connection. Then it is easy to see that $$F = 1 - \frac{R_{QU}}{BW} \sum_{i \in S_{QU}} \frac{1}{\log_2(1 + SIR_i)}$$

where $S_{QU}$ is the set of QoS users.

In our QoS aware setup, this F along with $N_{BEU}$ is transmitted to the WT as the carrier load information. (Note that this is a departure from a previously presented definition of load where $1/(1+N_{users})$ is transmitted as load information.)

We first describe the handoff methodology for QU. Each QU i forms a set $A_i$ of feasible connections that will be able to support its QoS requirement. More formally, a connection j belongs to $A_i$ if $$A_i = \{j : R_{QU} \leq BW \cdot F \cdot \log_2(1 + SIR_{ij})\},$$

where $SIR_{ij}$ is the SIR experienced by QU i if it were to be on connection j. Next for each connection in $A_i$, we calculate $SLIM_{QU}$ as an indication of the best-effort traffic performance if the QU were to make that connection:

$$SLIM_{QU} = \frac{BW \cdot F \cdot \log_2(1 + SIR_{ij}) - R_{QU}}{N_{BEU}}, \; j \in A_i.$$

The handoff methodology for the QU is as previously described with $SLIM=SLIM_{QU}$. The SLIM for BEU denoted by $SLIM_{BEU}$ is calculated as $$SLIM_{BEU} = \frac{BW \cdot F \cdot \log_2(1 + SIR_{ij})}{1 + N_{BEU}}.$$

The $SLIM_{BEU}$ is an indication of the best-effort traffic performance if the BEU were to handoff to a given connection. The handoff algorithm for the BEU is as described previously with $SLIM=SLIM_{BEU}$.

A simulation was performed to evaluate the described QoS awareness handoff. In the simulations, the ratio of the number of BEUs to the number of QUs is 2:1. The simulation results are very similar to the non-QoS case previously presented. In other words the QoS aware scheme not only ensures that QU connect to a sector/carrier pair that is able to support the users QoS requirement but does so without causing a drop in overall system throughput.

Various implementation issues will now be described including quantization of carrier load. The load information is an indication of the fraction of time-frequency resources, and affects the metric calculation and hence the performance of the handoff methodology. In one embodiment, a non-uniform quantization using finite bits is implemented to reduce messaging overhead. Specifically, it is quantized in exponential scale, that is, in the form of $2^{-n}$. For example, when using 3 bits, the load information is quantized to one of the following numbers:

$$\{2^{-7}, 2^{-6}, 2^{-5}, 2^{-4}, 2^{-3}, 2^{-2}, 2^{-1}, 2^{-0}\} = \{0.0078125, 0.015625, 0.03125, 0.0625, 0.125, 0.25, 0.5, 1\}$$

Figure 7:
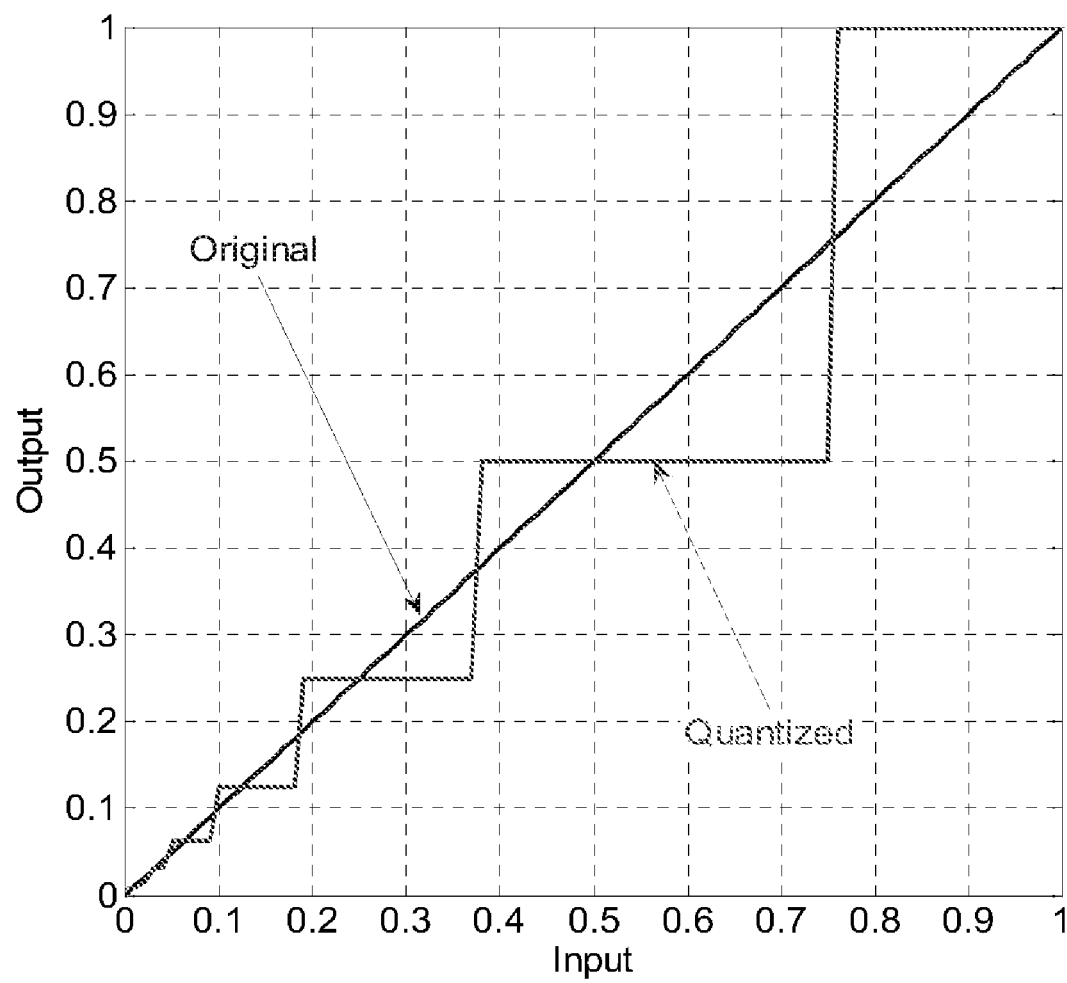
FIG. 7 illustrates the input-output relationship of an exemplary quantizer used for load information.

The input-output relationship of the quantizer is shown in drawing 700 of FIG. 7.

From simulation it was observed that using less than 3 bits to represent the load information degrades the performance significantly. Therefore in various embodiments, at least 3 bits are used to represent the load information.

An approximation of the SLIM function used in some embodiments will now be described. In the SLIM calculation, in one embodiment, we convert the SIR to linear scale since it is given in dB. Since converting from dB to linear scale is an expensive calculation in the WT, we use the following approximation to do without the scale conversion of the SIR.

$$SIR^{dB} > 17 \text{ dB} \qquad \qquad \text{i)}$$

$$\log_{10}(1+SIR^{linear}) \approx 0.1 \cdot SIR^{dB}$$

$$0 \text{ dB} < SIR^{dB} \leq 17 \text{ dB} \qquad \qquad \text{ii)}$$

$$\log_{10}(1+SIR^{linear}) \approx 0.1 \cdot (2.93+0.6103 \cdot SIR^{dB}+0.0135 \cdot (SIR^{dB})^2)$$

$$-20 \text{ dB} < SIR^{dB} \leq 0 \text{ dB} \qquad \qquad \text{iii)}$$

$$\log_{10}(1+SIR^{linear}) \approx 0.0007325 \cdot (SIR^{dB}+20)^2$$

$$SIR^{dB} \leq -20 \text{ dB} \qquad \qquad \text{iv)}$$

$$\log_{10}(1+SIR^{linear}) \approx 0$$

Figure 8:
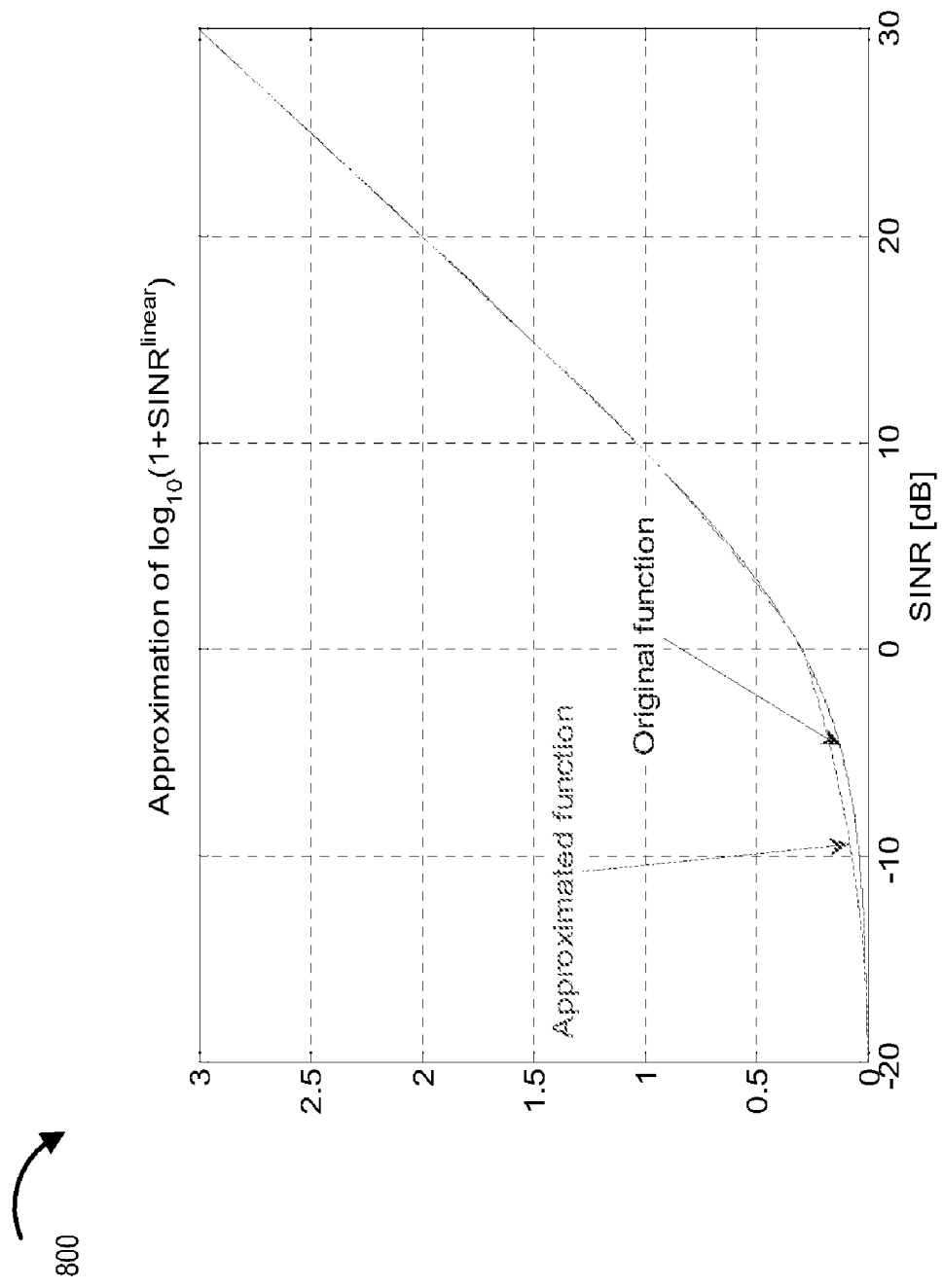
FIG. 8 illustrates graphically an approximation used for one exemplary SLIM function.

Drawing 800 of FIG. 8 illustrates the approximation graphically.

A handoff methodology for a multi-carrier system has been described to achieve the appropriate load-balancing to maximize the system throughput. The handoff methodology uses a metric called the service level indicating metric (SLIM) that combines the loading information with the signal quality represented by the SIR. The ideas developed here can apply to any multi-carrier or multi-channel network where the WT is limited to a single channel. In particular, in various OFDM schemes such as, e.g., 802.11, an access point can deploy as many as 3 non-overlapping channels and the WT handoff methodology can be driven by the framework developed here. The methods and apparatus described herein are also useful in systems where an access point, e.g., base station deploys more than three non-overlapping channels.

The following are the basic assumptions for the simulations.

Cell Layout and Configurations.

Hexagonal grid 19-cell wrap around layout: Only the statistics of the users allocated to the inner ring are considered in order to minimize the imperfect wrap around configuration for the exemplary multi-carrier multi-power level OFDM deployment scheme.

3 sectors per cell

Cell-to-cell distance: 1 km

Minimum distance between the mobile terminal and the cell site: 35 m

Antenna Configurations 3 dB cutoff angle: $\angle 3 \text{ dB}=65°$

Front-to-back loss: Am=32 dB

Antenna pattern:

$$A(\theta) = -\min\left\{12 \cdot \left(\frac{\theta}{\theta_{3dB}}\right)^2, A_m\right\} \text{ [dB]}$$

Antenna height

BS: $h_{BS}=32$ m

MT: $h_{MT}=1.5$ m

Radio Configurations

Carrier frequency: $f_c=450$ MHz

BW per carrier: BW=113×11.25 kHz=1.271250 MHz

Number of carriers: N=3 (equal powers or multi-power level)

In equal powers configuration, the powers of all the carriers are identical.

In multi-power level configuration, the power of the strongest carrier is 6 dB higher than that of the second strongest carrier and the power of the weakest carrier is 6 dB lower than that of the second strongest carrier.

Propagation
    Distance-dependent path loss:

$$PL(r) = 46.3 + 33.9 \cdot \log_{10}(f_c) -$$
$$13.82 \cdot \log_{10}(h_{BS}) + \{44.9 - 6.55 \cdot \log_{10}(h_{BS})\} \cdot \log_{10}(r) -$$
$$\{1.1 \cdot \log_{10}(f_c) - 0.7\} \cdot h_{MT} + \{1.56 \cdot \log_{10}(f_c) - 0.8\} \text{ [dB]}$$

r in km, $f_c$ in MHz, and $h_{BS}/h_{MT}$ in m.
    No shadowing.
Mobile Terminal Configurations
    Number of mobile terminals: 60 users per sector on average.
    Mobile terminals are dropped within the radius of the cell and are uniformly distributed (in terms of $r^2$) within each cell.
SIR Derivation
    Interference-limited scenario (background noise=0).
    SIR when connected to sector/carrier k:

$$SIR_k = \frac{PL_k}{\sum_{i \neq k} PL_i} \text{ [linear]}$$

where PL is the path loss in linear scale.
Throughput Calculation
    Throughput calculation is based on Shannon's capacity upper bound for Gaussian channel.
    We assume the resources are evenly allocated to the users within the same sector/carrier. Thus, the throughput for user n in sector/carrier k is calculated as follows:

$$TP_n = \frac{BW}{N_{users,k}} \log_2(1 + SIR_{n,k}) \text{ [bps]}$$

where $N_{users,k}$ is the number of users in sector/carrier k.

Figure 9:
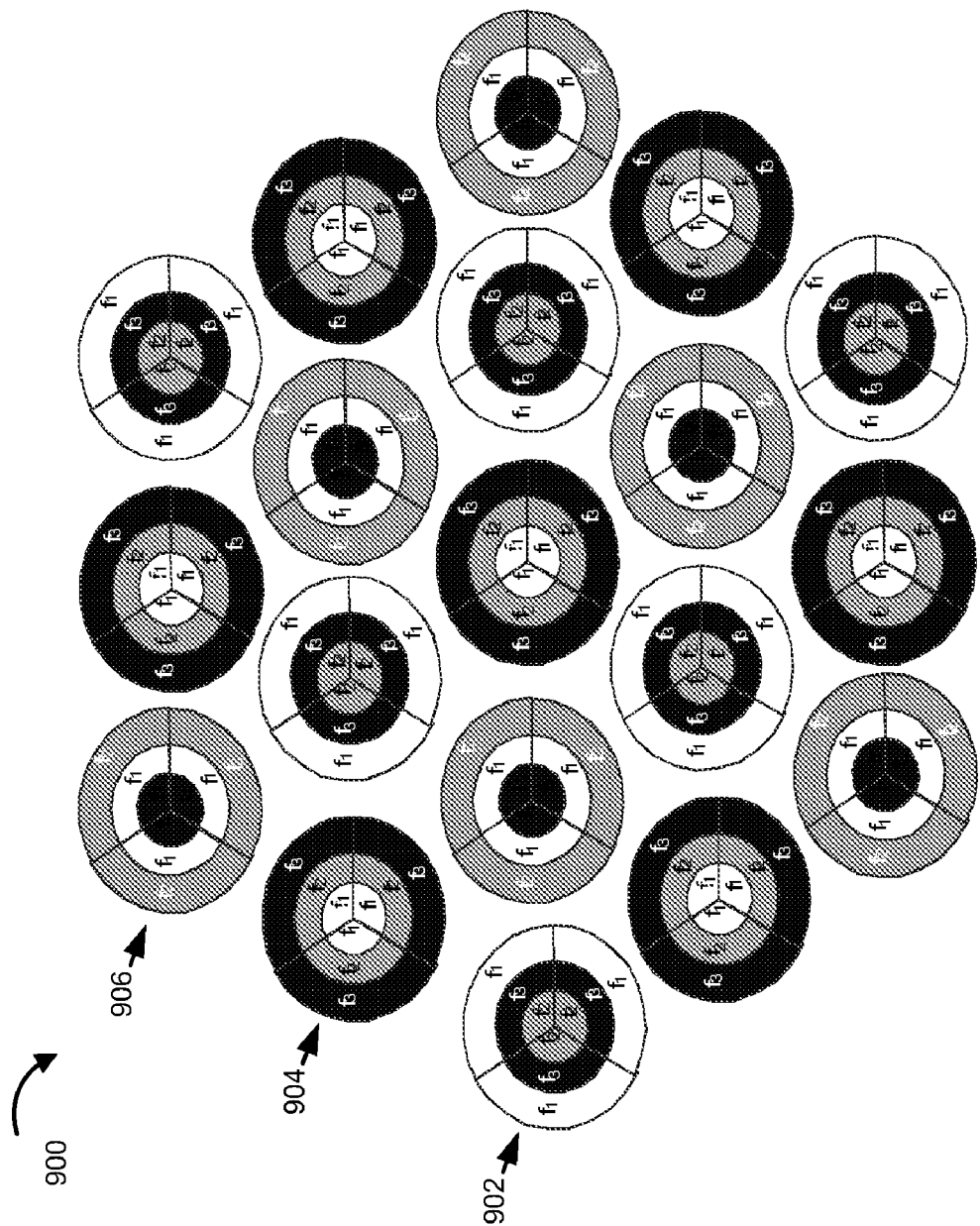
FIG. 9 illustrates an exemplary multi-carrier multi-power level multi-sector deployment scheme, used in some OFDM embodiments, in which utilizing SLIM based handoff is beneficial.

Drawing 900 of FIG. 9 illustrates an exemplary multi-carrier multi-power level multi-sector deployment scheme used in some OFDM embodiments. In this scheme each there are three-sector cells, with each sector having 3 attachment points. One attachment point corresponding to each carrier (f1, f2, f3) for each sector. Thus there are nine attachment points per cell. In some such embodiments the nine attachment points are part of a single base station, while in other embodiments, each attachment point or multiple attachment points may be grouped into a base station.

In the example of FIG. 9 there are three types of cells. In the first type of cell carrier frequency f1 is associated with the high power level, carrier frequency f3 is associated with the intermediate power level, and carrier frequency f2 is associated with the low power level. In the second type of cell carrier frequency f3 is associated with the high power level, carrier frequency f2 is associated with the intermediate power level, and carrier frequency f1 is associated with the low power level. In the third type of cell carrier frequency f2 is associated with the high power level, carrier frequency f1 is associated with the intermediate power level, and carrier frequency f3 is associated with the low power level. Exemplary cell 902 is a cell of the first type; exemplary cell 904 is a cell of the second type; exemplary cell 906 is a cell of the third type.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, receiving a signal, determining a best connection for a carrier of interest, calculating a service level indicating metric for a current attachment point, calculating a service level indicating metric for an alternative attachment point, making a handoff decision. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of making handoff determinations in an access terminal, the method comprising:
receiving power reference signals from attachment points, said power reference signals including power reference signals corresponding to a plurality of different carriers, at least some of the power reference signals corresponding to a carrier being transmitted from different attachment points at different known power levels;
identifying on a per carrier basis, an attachment point with which the best connection can be established, said identifying, on a per carrier basis, an attachment point with which the best connection can be established including selecting an attachment point as a function of the difference between known transmission power levels corresponding to different attachment points and the strength of the power reference signals received from the different attachment points;
calculating a first service level indicating metric corresponding to a current connection corresponding to a first attachment point using a first function;
calculating a second service level indicating metric corresponding to an alternative connection corresponding to a second attachment point using a second function which is different from said first function; and
making a handoff decision based on said first and second service level indicating metrics.

2. The method of claim 1, wherein calculating said first and second service level indicating metrics is performed as a function of loading factor information corresponding to the first and second attachment points, respectively.

3. The method of claim 2, wherein said second function used to calculate said second service level indicating metric includes a factor corresponding to an additional load which will be placed on said second attachment point if a handoff to said second attachment point occurs.

4. The method of claim 1, wherein said second attachment point is an identified attachment point with which the best connection can be established for at least one carrier.

5. The method of claim 1, wherein the power reference signals corresponding to a carrier were transmitted at the same power level;
and wherein identifying the attachment point with which the best connection can be established includes selecting the attachment point from which the strongest power reference level signal corresponding to the carrier was received.

6. The method of claim 4, wherein for each carrier on which a power reference level signal was received, a service level indicating metric is calculated for the corresponding attachment point identified as having the best connection.

7. The method of claim 6, wherein service level indicating metrics are not computed for attachment points which are not identified as having the best connection.

8. The method of claim 3, wherein said loading factor information indicates a number of users using the corresponding connection.

9. The method of claim 3, wherein said loading factor information includes a total link sharing weight of the attachment point.

10. The method of claim 9,
wherein the total link sharing weight of the attachment point is the sum of link sharing weights of users using the attachment point;
wherein the first and second functions are a function of a link sharing weight corresponding to the device for which a handoff determination is being made.

11. An access terminal comprising:
a wireless receiver module for receiving power reference signals from attachment points, said power reference signals including power reference signals corresponding to a plurality of different carriers, at least some of the power reference signals corresponding to a carrier being transmitted from different attachment points at different known power levels;
a best connection identification module for identifying on a per carrier basis, the attachment points with which the best connection can be established using the corresponding carrier, said best connection identification module including a received power based selection sub-module for selecting the attachment point as a function of the difference between known transmission power levels corresponding to different attachment points and the strength of the power reference level signals received from the attachment points;
a first service level indicating metric calculation module for calculating a first service level indicating metric corresponding to a current connection corresponding to a first attachment point using a first function;
a second service level indicating metric calculation module for calculating a second service level indicating metric corresponding to an alternative connection corresponding to a second attachment point using a second function which is different from said first function; and
a handoff decision module for making a handoff decision based on said first and second service level indicating metrics.

12. The access terminal of claim 11, wherein said first service level indicating metric calculation module calculates said first service level indicating metric as a function of loading factor information corresponding to the first attachment point, and
wherein said second service level indicating metric calculation module calculates said second service level indicating metric as a function of loading factor information corresponding to the second attachment point.

13. The access terminal of claim 12, wherein said second function used to calculate said second service level indicating metric includes a factor corresponding to an additional load which will be placed on said second attachment point if a handoff to said second attachment point occurs.

14. The access terminal of claim 11, wherein said second attachment point is an identified attachment point with which the best connection can be established for at least one carrier.

15. The access terminal of claim 11, wherein the power reference signals corresponding to a carrier were transmitted at the same power level; and
wherein the best connection identification module includes a received power based selection sub-module for selecting the attachment point from which the strongest power reference level signal corresponding to the carrier was received.

16. The access terminal of claim 11, wherein for each carrier on which a power reference level signal was received, at least one of said first service level indicating metric calculation module and said second service level indicating metric calculation module calculates a service level indicating metric for the corresponding attachment point identified as having the best connection.

17. The access terminal of claim 16, wherein said second service level indicating metric calculation module does not compute a service level indicating metric for attachment points which are not identified as having the best connection.

18. The access terminal of claim 13, wherein said loading factor information indicates a number of users using the corresponding connection, the access terminal further comprising:
   a loading factor recovery module for recovering loading factor information from received broadcast signals.

19. The access terminal of claim 13, wherein said loading factor information includes a total link sharing weight of the attachment point, the access terminal further comprising:
   a loading factor recovery module for recovering loading factor information from received broadcast signals.

20. The access terminal of claim 19, wherein the first and second functions are a function of a link sharing weight corresponding to the device for which a handoff determination is being made.

21. An access terminal comprising:
   wireless receiver means for receiving power reference signals from attachment points, said power reference signals including power reference signals corresponding to a plurality of different carriers, at least some of the power reference signals corresponding to a carrier being transmitted from different attachment points at different known power levels;
   best connection identification means for identifying on a per carrier basis, the attachment points with which the best connection can be established using the corresponding carrier, said best connection identification means including received power based selection means for selecting the attachment point as a function of the difference between known transmission power levels corresponding to different attachment points and the strength of the power reference level signals received from the attachment points;
   first service level indicating metric calculation means for calculating a first service level indicating metric corresponding to a current connection corresponding to a first attachment point using a first function;
   second service level indicating metric calculation means for calculating a second service level indicating metric corresponding to an alternative connection corresponding to a second attachment point using a second function which is different from said first function; and
   handoff decision means for making a handoff decision based on said first and second service level indicating metrics.

22. The access terminal of claim 21, wherein said first service level indicating metric calculation means calculates said first service level indicating metric as a function of loading factor information corresponding to the first attachment point, and
   wherein said second service level indicating metric calculation means calculates said second service level indicating metric as a function of loading factor information corresponding to the second attachment point.

23. The access terminal of claim 22, wherein said second function used to calculate said second service level indicating metric includes a factor corresponding to an additional load which will be placed on said second attachment point if a handoff to said second attachment point occurs.

24. The access terminal of claim 21, wherein said second attachment point is an identified attachment point with which the best connection can be established for at least one carrier.

25. A computer program product, comprising:
   non-transitory computer-readable medium comprising:
      code for causing a computer to receive power reference signals from attachment points, said power reference signals including power reference signals corresponding to a plurality of different carriers, at least some of the power reference signals corresponding to a carrier being transmitted from different attachment points at different known power levels;
      code for causing a computer to identify on a per carrier basis, an attachment point with which the best connection can be established, said code for causing the computer to identify including code for causing the computer to select an attachment point as a function of the difference between known transmission power levels corresponding to different attachment points and the strength of the power reference signals received from the different attachment points;
      code for causing a computer to calculate a first service level indicating metric corresponding to a current connection corresponding to a first attachment point using a first function;
      code for causing a computer to calculate a second service level indicating metric corresponding to an alternative connection corresponding to a second attachment point using a second function which is different from said first function; and
      code for causing a computer to make a handoff decision based on said first and second service level indicating metrics.

26. The computer program product of claim 25, wherein calculating said first and second service level indicating metrics is performed as a function of loading factor information corresponding to the first and second attachment points, respectively.

27. The computer program product of claim 26, wherein said second function used to calculate said second service level indicating metric includes a factor corresponding to an additional load which will be placed on said second attachment point if a handoff to said second attachment point occurs.

28. The computer program product of claim 25, wherein said second attachment point is an identified attachment point with which the best connection can be established for at least one carrier.

29. An apparatus comprising:
   a processor configured to:
      receive power reference signals from attachment points, said power reference signals including power reference signals corresponding to a plurality of different carriers, at least some of the power reference signals corresponding to a carrier being transmitted from different attachment points at different known power levels;
      identify on a per carrier basis, an attachment point with which the best connection can be established, said processor being configured, as part of being configured to identify on a per carrier basis an attachment point with which the best connection can be established, to select an attachment point as a function of the difference between known transmission power levels corresponding to different attachment points and the strength of the power reference signals received from the different attachment points;

calculate a first service level indicating metric corresponding to a current connection corresponding to a first attachment point using a first function;

calculate a second service level indicating metric corresponding to an alternative connection corresponding to a second attachment point using a second function which is different from said first function; and make a handoff decision based on said first and second service level indicating metrics.

30. The apparatus of claim 29, wherein calculating said first and second service level indicating metrics is performed as a function of loading factor information corresponding to the first and second attachment points, respectively.

31. The apparatus of claim 30, wherein said second function used to calculate said second service level indicating metric includes a factor corresponding to an additional load which will be placed on said second attachment point if a handoff to said second attachment point occurs.

32. The apparatus of claim 29. wherein said second attachment point is an identified attachment point with which the best connection can be established for at least one carrier.

* * * * *